United States Patent [19]

Thompson

[11] Patent Number: 4,687,393

[45] Date of Patent: Aug. 18, 1987

[54] CENTERING PIN WITH OVALOID POINT

[76] Inventor: Wilbur O. Thompson, 815 S. 2nd St., DeKalb, Ill. 60115

[21] Appl. No.: 805,773

[22] Filed: Dec. 6, 1985

[51] Int. Cl.$^4$ .............................................. F16B 19/02
[52] U.S. Cl. .................................... 411/351; 411/499; 411/451; 29/275
[58] Field of Search ............... 411/351, 489, 491, 498, 411/499, 451; 29/275

[56] References Cited

U.S. PATENT DOCUMENTS

| | | | |
|---|---|---|---|
| 1,109,328 | 9/1914 | Evans | 411/499 |
| 1,645,817 | 10/1927 | Nystrom | 411/351 |
| 1,933,317 | 10/1933 | Curtis | 411/451 |

Primary Examiner—James L. Ridgill, Jr.
Attorney, Agent, or Firm—Tilton, Fallon, Lungmus & Chestnut

[57] ABSTRACT

A centering pin having a head, round shaft and tapered, ovaloid point is disclosed. Opposing sides of said tapered point are symmetrical such that the radius of each is equal to the radius of the round shaft of the pin. The tapered pin point can readily be inserted into partially aligned holes in metal plates, leather straps, etc. that are to be connected and secured by said pin. A cotter pin or the like is inserted into an aperture on the shaft adjacent the tapered point to securely position the pin once it is passed through the holes of the items being connected.

3 Claims, 5 Drawing Figures

CENTERING PIN WITH OVALOID POINT

BACKGROUND AND SUMMARY OF INVENTION

This invention relates to a centering pin for fastening or connecting items of materials with bolt holes in a quick, facile manner. More particularly, this invention relates to a pin with a tapered ovaloid point that is capable of entering partially aligned holes in materials or items to be connected.

Conventional drift pins with or without tapered points are not capable of entering partially aligned holes in machine straps, plates, etc. One must exactly or at least substantially align the mating holes first before inserting the drift pin. For example, when mounting heavy implements, such as mowers, roto-tilers, snow blowers, etc. onto garden tractors, the task of aligning bolt holes becomes burdensome. The two bolt holes must be accurately positioned to accept the drift pin.

There is a definite need for a drift pin that provides a greater cross-section in the mating holes so as to engage the edges of the bolt holes than provided by conventional drift pins.

One object of this invention is to provide a drift pin with a greater cross section in the tapered point than conventional drift pins.

Another object of this invention is to provide a pin with a tapered, ovaloid point.

Another object of this invention is to provide a pin with a point tapered symmetrically on opposite sides with the radius of each side being equal to the radius of the main shaft of the pin.

Another object of this invention is to provide a drift pin which continuously engages the edges of the holes that are to be aligned whether the pin is partially within the holes, or if the pin has almost completely passed the tapered point within the holes, or if the tapered point has passed completely through the holes and the main shaft of the pin is in place.

And yet another object of this invention is to provide a drift pin that can readily enter partially aligned holes.

DETAILED DESCRIPTION OF THE INVENTION

Figure 1:
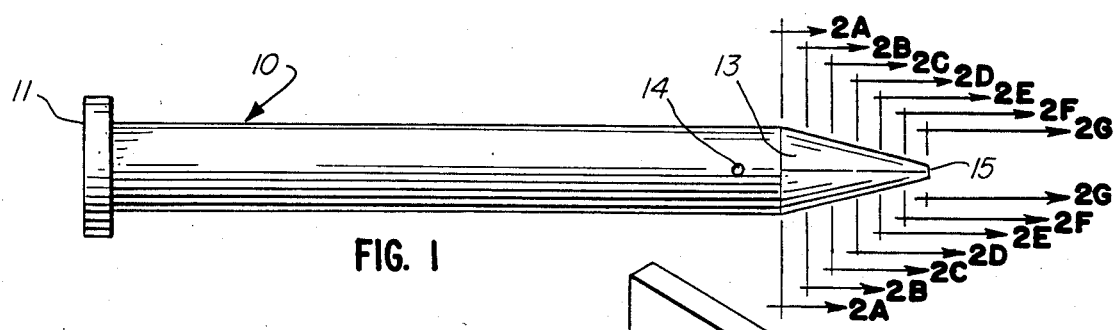
FIG. 1 is a plan view of the pin according to the present invention.
Figure 2A:
FIG. 2a to FIG. 2g are a series of sectional views taken at lines A—A through F—F of FIG. 1.
Figure 2B:
Figure 2C:
Figure 2D:
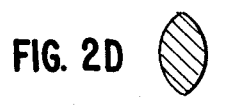
Figure 2E:
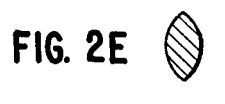
Figure 2F:
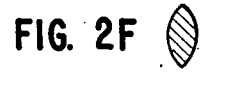
Figure 2G:

Referring initially to FIG. 1, the numeral 10 designates generally the centering pin of the present invention. The pin 10 has a head 11, round main shaft 12, tapered ovaloid point 13 and an aperture 14 formed on the main shaft adjacent tapered ovaloid point 13. The pin can be made in various lengths and diameters so as to accommodate holes in a particular machines, machine parts, or materials being utilized. Aperture 14 is for receiving a cotter pin or other fastening pin to lock centering pin 10 in place after pin 10 has been inserted through machine straps, plates, etc.

Point 13 is tapered from round main shaft 12 to apex 15. The point 13 is generally in an ovaloid shape with symmetrical opposing sides having a radius equal to the radius of round main shaft 12. Cross sections A—A through F—F of point 13 are illustrated in FIG. 2 to show the ovaloid shape of point 13 along its length. As the cross sections are taken on the point 13 located distally from round main shaft 12 towards apex 15, the ovaloid shape of the point 13 becomes more apparent. It will be understood that the tapered point 13 can be formed of any length desired, depending on the forces required to align the holes of mating pieces.

The ovaloid shape of point 13 allows for the full cross section of the point 13 to completely fill the holes and to fully engage the edges of the respective holes to which pin 10 is to be inserted, regardless if the holes are partially or fully aligned.

Figure 4:
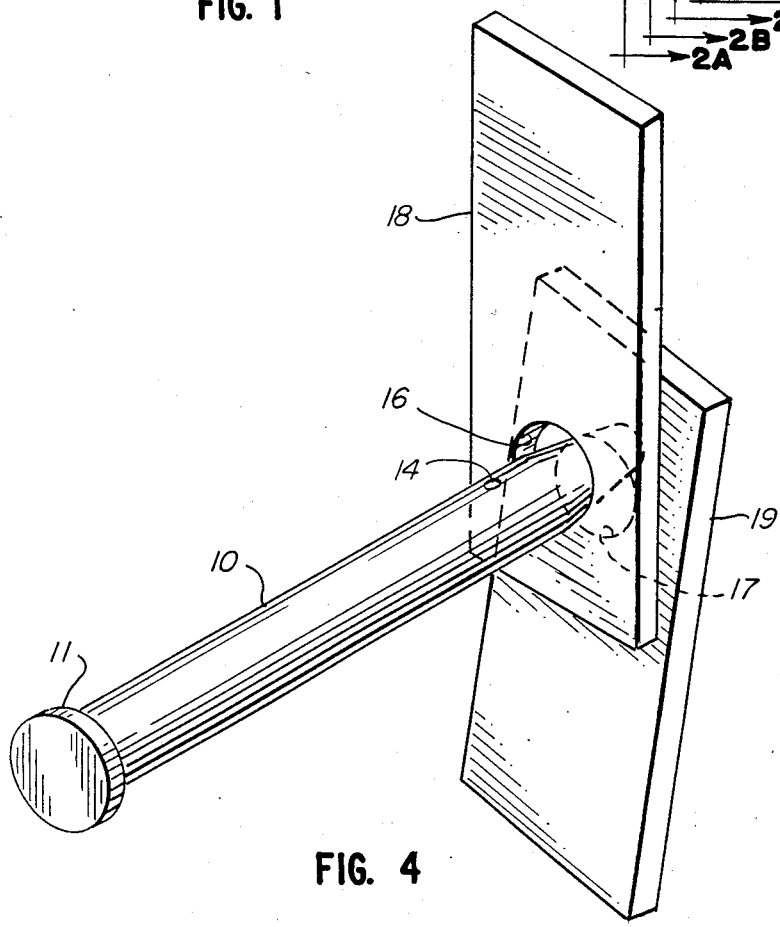
FIG. 4 is a perspective view of the two plates with the tapered, ovaloid point of the pin of this invention partially inserted through the off-centered holes.
Figure 3:
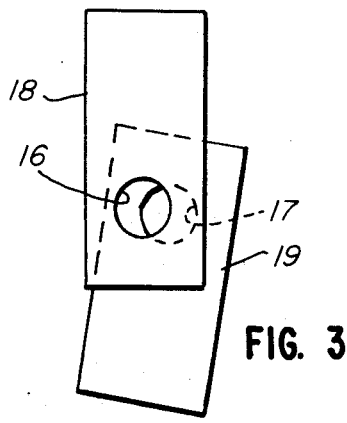
FIG. 3 is a perspective view of two metal plates with off-centered holes.

As illustrated in FIG. 3, holes 16 and 17 respectively, of metal plates 18 and 19, are partially out of alignment. When pin 10 is inserted through the holes 16 and 17 as in FIG. 4, the edge surface of hole 17 in plate 19 is engaged by point 13 in a manner to align the hole 17 with hole 16 in plate 18, thereby resulting in an easy connection of the two plates upon the application of force to pin 10 at head 11.

Figure 5:
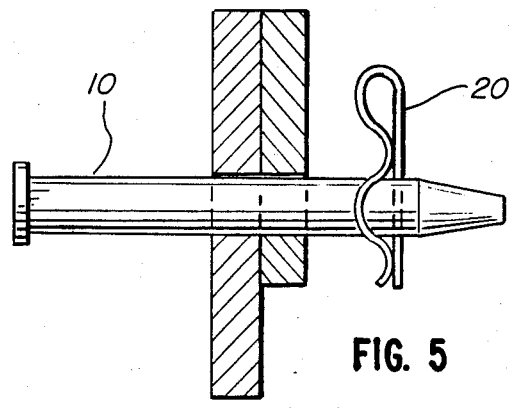
FIG. 5 is a side elevational view of the pin of this invention inserted through the holes of two metal plates with a cotter pin inserted in the pin.

When pin 10 is fully inserted into pieces 18 and 19, a cotter pin 20 may be inserted if desired into aperture 14 to provide locking means, as shown in FIG. 5.

While in the foregoing specification a detailed description of an embodiment of the invention has been set down for purpose of illustration, many variations in the details herein given may be made by those skilled in the art without departing from the spirit and scope of the invention.

I claim:

1. A pin which comprises:
   (a) a head;
   (b) a round central shaft; and
   (c) a tapered point connected to the round shaft opposite the head having symmetrical opposing sides, each side having a radius substantially equal to the radius of said round shaft extending the length of said tapered point, said point having a straight longitudinal taper.

2. The pin of claim 1 and including an aperture extending through said round central shaft adjacent to said tapered point for receiving a fastening pin.

3. A centering pin for joining mating pieces, said centering pin comprising a round central body portion terminating at one end in a head portion and at the opposite end in a tapered point portion connected to the round shaft, said tapered point portion having a generally ovaloid-shaped cross section along its length, said tapered point portion operable when inserted in misaligned holes of the mating pieces to substantially fill the holes and engage the edge surfaces thereof by having the marginal surface of said tapered point in constant contact with the pieces to be aligned.

* * * * *